United States Patent Office 2,724,348
Patented Nov. 22, 1955

2,724,348

DEVICE FOR FORMING A CONTINUOUS SHEET OF DOUGH AND LIKE PLASTIC MATERIAL

Willem Neutelings, Bergen op Zoom, Netherlands, and Joannes B. Kengen, Kapellen, Belgium, assignors to Industrie- en Handelmaatschappij "De Vuurslag" C. V., Roosendaal, Netherlands, a company of the Netherlands Application December 30, 1953, Serial No. 401,320

Claims priority, application Netherlands January 9, 1953

1 Claim. (Cl. 107—12)

This invention relates to a device for forming a continuous sheet of dough and like plastic material, comprising a hopper for the dough to be treated, below which a set of rollers is mounted and discharges the dough from the hopper in the form of a continuous sheet.

With the known devices of this kind a pair of longitudinal ribbed rollers are located below the hopper and are rotating in opposite directions and leave a gap with respect to each other, from which the dough emerges in a compression chamber below the rollers, said chamber being provided with a slot of adjustable width, so that by varying the width of the slot the thickness of the sheet of dough obtained may be varied. Said known devices, however, suffer the drawback that the sheet of dough emerging from the compression chamber remains rough on both sides, so that it is not possible to obtain smooth baking goods from the sheet of dough. Said drawback can be removed by providing the device with one or more smooth rollers which smooth the sheet of dough at least at one side.

Said known devices, however, are not adapted for treating hard, very elastic kinds of dough, as such dough in view of its elasticity cannot be compressed uniformly, so that the sheet of dough when leaving the compression chamber has an irregular thickness.

The invention has for its object to obtain a device adapted for treating soft kinds as well as hard kinds of dough. According to the invention three rollers are mounted below the hopper and one of said rollers has a considerably larger diameter than both other rollers and both said smaller rollers are superimposed and each leave a gap for passing the dough with respect to the larger roller.

With said arrangement a spacing block is located between both smaller rollers, said block constituting a wall of the chamber bound by the rollers. When treating soft dough said chamber serves as compression space so that it is completely filled with dough. For treating hard, very elastic dough, however, the rollers are adjusted to such a position that an equal quantity of dough is fed between the upper roller and the large roller as is discharged between said large roller and the lower small roller, so that the chamber cannot be filled and the dough in the chamber is not subjected to pressure. The large roller now only serves as a carrier for the sheet of dough.

The invention will be further described with reference to the accompanying drawings, in which—

Figure 1:
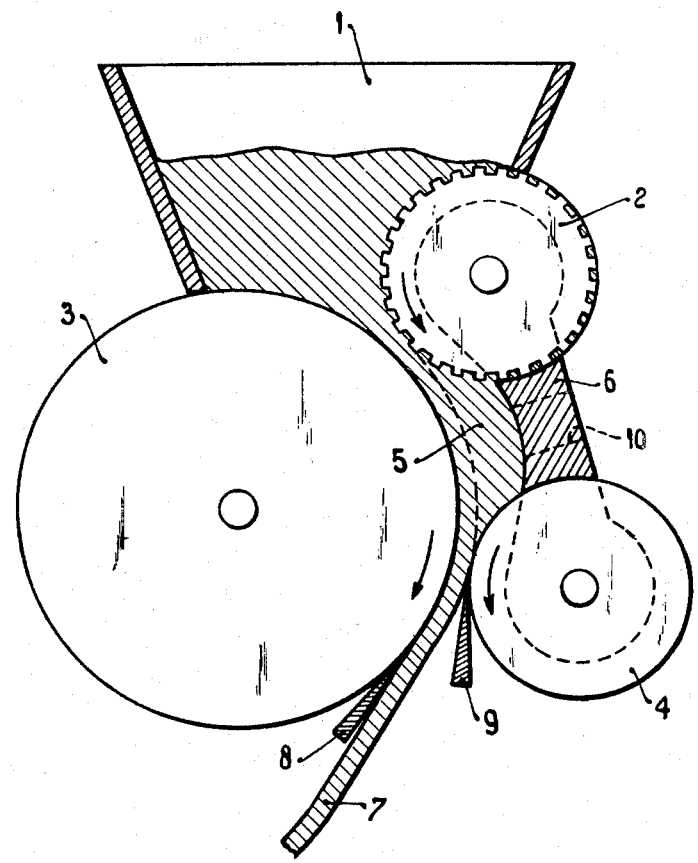
Fig. 1 shows a diagrammatic side elevation of the rollers.
Figure 2:
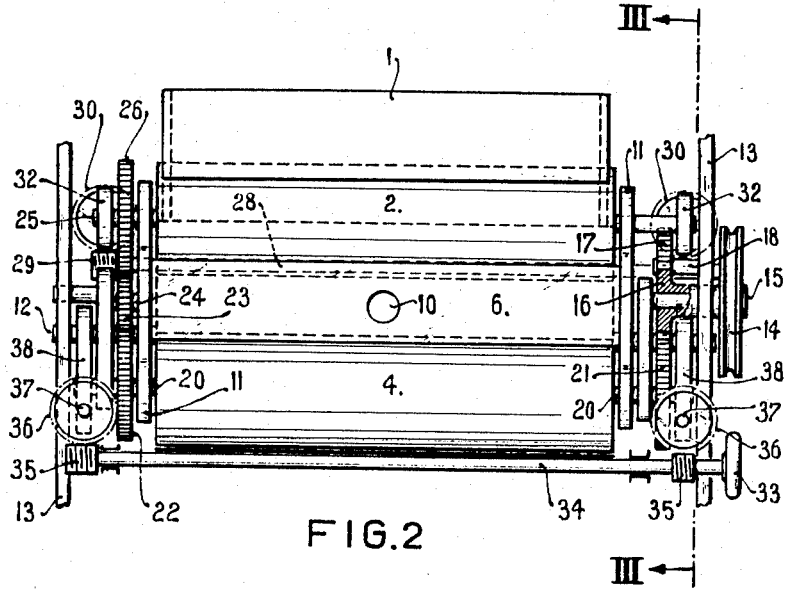
Fig. 2 is a front view on a smaller scale of the rollers with their driving mechanism and Fig. 3 is a side elevation partly in section along line III—III of Fig. 2.
Figure 3:
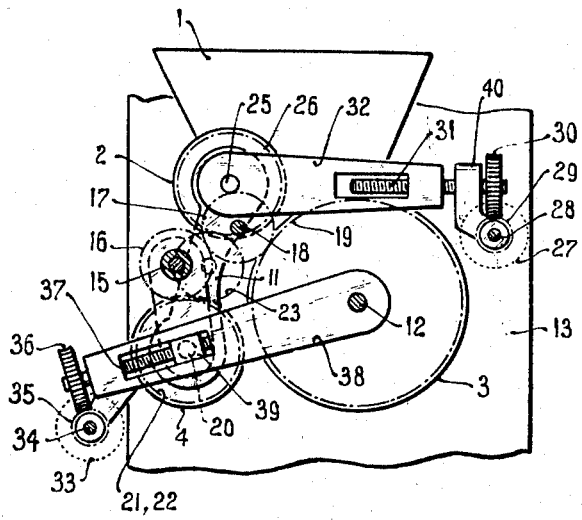

Below the hopper 1 a ribbed roller 2 of small diameter and a large smooth roller 3 are mounted. Below the roller 2 a smooth roller 4 also of small diameter is mounted. The chamber 5 enclosed by the rollers 2, 3 and 4 is bound by a spacing block 6. The gaps between the rollers 2 and 3 and between the rollers 3 and 4 are adjustable and by said adjustment the pressure in the compression chamber 5 may be varied. The rollers 3, 4 are rotated with mutually equal circumferential speeds, so that they give the desired thickness to the sheet of dough and smooth it. For treating soft dough the rollers are adjusted to such a position that the compression chamber 5 is completely filled.

The dough taken along by the ribs of the roller 2 is stripped from the roller by the edge of the spacing block 6, so that only the dough lying in the grooves between the ribs rotates together with the roller.

In order to take care that the sheet of dough 7 is released from the roller 3 a knife 8 is provided. A corresponding knife 9 cooperates with the roller 4.

When treating hard dough the roller 2 is adjusted to such a position that an equal quantity of dough is fed between the rollers 2, 3 as is discharged by the rollers 3, 4. The sheet of dough formed between the rollers 2, 3 is then supported on the surface of the roller 3 as is shown by a dotted line in Fig. 1, so that the dough is prevented from bulging out and cannot be folded between the rollers 3, 4. Between the rollers 2 and 4 the roller 3 thus serves as a carrier for the sheet of dough. In order to examine the sheet of dough in the chamber 5 the spacing block 6 is provided with a removable part 10.

As in this case the pressure chamber 5 is not completely filled no dough will be left between the ribs of the roller 2. In order, however, to secure that the dough is released from the roller 2 it is advisable to make the grooves of the roller 2 less deep than usually.

The rollers 2 and 4 are supported in two webs 11, to which also the spacing block 6 is secured and said webs are adjustable with respect to the axis of the roller 3. The roller 3 with its shaft 12 is supported in walls 13 of the frame. The rollers are driven by a pulley 14 secured on a hollow shaft 15 carrying at its other end a toothed wheel 16. Said toothed wheel meshes with a toothed wheel 17 which is freely rotatable on a journal 18 secured in the frame wall 13, said wheel meshes with a toothed wheel 19 secured to the shaft 12 of roller 3. Toothed wheel 16 also meshes with a toothed wheel 21 secured on the shaft 20 of roller 4.

The shaft 20 of roller 4 carries at its other end a toothed wheel 22 meshing with a freely rotatable toothed wheel 23, having its journal 24 secured to the web 11. The toothed wheel meshes with a toothed wheel 26 secured on the shaft 25 of roller 2.

A handwheel 27 is provided for adjusting the roller 2 and the rod 28 of said wheel carries a worm 29 meshing with a worm wheel 30, the shaft of said wheel being provided with screw thread and screwed into a link 32 mounted on the end of the shaft 25 of the roller 2, so that by rotating the rod 31 through the intermediary of handwheel 27 roller 2 is displaced. To this end rod 31 is journalled in the bracket 40 and secured against longitudinal movement therein.

A handwheel 33 is provided for adjusting the roller 4 and the rod 34 of said wheel carries two worms 35, each meshing with a worm wheel 36 secured on a screw threaded rod 37 secured against axial displacement in a link 38 and carrying a nut block 39 mounted on the end of the shaft 20 of roller 4. When handwheel 33 is rotated the shaft 20 of the roller is displaced. The links 38 at their other end are mounted on the shaft 12 of roller 3.

What we claim is:

A device for pressure shaping a continuous sheet from a plastic material such as dough comprising a hopper having a lower outlet end for the supply of said material, a three roller assembly located underneath the lower outlet end of said hopper said assembly being composed of one large roller and two smaller rollers of an equal size, said large roller and said two smaller rollers being vertically superposed above each other in such a manner that the connecting lines of the centers of said three rollers form a substantially equilateral triangle and the rollers form a chamber therebetween, each of said smaller rollers forming gaps with said large roller for the passage therebetween of the plastic material, a wall connecting said two smaller rollers, and projections applied to the uppermost of said two superposed rollers and means for adjusting said two smaller rollers independently of each other and with respect to said larger roller.

References Cited in the file of this patent
UNITED STATES PATENTS

| | | |
|---|---|---|
| 954,937 | Day et al. | Apr. 12, 1910 |
| 1,768,749 | De Vito | July 1, 1930 |
| 2,526,944 | Grainger | Oct. 24, 1950 |